(12) United States Patent
Nielsen et al.

(10) Patent No.: US 6,722,506 B1
(45) Date of Patent: Apr. 20, 2004

(54) METHOD FOR WEIGHT CONTROLLED BATCHING OUT OF ARTICLES HAVING NON-UNIFORM WEIGHT

(75) Inventors: Ulrich Carlin Nielsen, Ry (DK); Svend Bækhøj Jensen, Egå (DK)

(73) Assignee: Scanvaegt International A/S, Aarhus N (DK)

(*) Notice: Subject to any disclaimer, the term of this patent is extended or adjusted under 35 U.S.C. 154(b) by 0 days.

(21) Appl. No.: 09/806,506

(22) PCT Filed: Oct. 15, 1999

(86) PCT No.: PCT/DK99/00566

§ 371 (c)(1), (2), (4) Date: Jun. 20, 2001

(87) PCT Pub. No.: WO00/23772

PCT Pub. Date: Apr. 27, 2000

(30) Foreign Application Priority Data

Oct. 15, 1998 (DK) .......................................... 1998 01319
Oct. 15, 1998 (DK) .......................................... 1998 01318
Jan. 22, 1999 (DK) .......................................... 1999 00073

(51) Int. Cl.$^7$ ................................................ B65B 25/06
(52) U.S. Cl. ...................... 209/592; 209/552; 209/596; 700/240; 700/219
(58) Field of Search ............................... 709/592, 552, 709/596; 700/240, 219

(56) References Cited

U.S. PATENT DOCUMENTS 4,122,941 A * 10/1978 Giles et al. ............... 198/774.1
4,709,770 A * 12/1987 Kohashi et al. ................ 177/50
5,814,772 A * 9/1998 Nishimura et al. .......... 177/145
6,321,135 B1 * 11/2001 Asgeirsson .................. 700/213
6,408,223 B1 * 6/2002 Skyum et al. ............... 700/213

FOREIGN PATENT DOCUMENTS

GB          2116732         9/1983
WO          WO 96/08322     3/1996

* cited by examiner

Primary Examiner—Donald P Walsh
Assistant Examiner—Jonathan R Miller
(74) Attorney, Agent, or Firm—Nixon Peabody LLP; David S. Safran

(57) ABSTRACT

A method of batching out items in a weight controlled manner from an incoming flow of the items, the items having non-uniform weights, by allocating the items to a plurality of receiver stations. The method includes the steps of determining weight of individual items, determining preferential allocation of each individual item to a consequently selected receiver station based on accumulated weight of items already located in the selected receiver station and preset operational conditions, portioning-out the items by transferring each individual item to the allocated selected receiver station, calculating efficiency of ongoing portioning-out process using relevant parameters, calculating simulated efficiency of a portioning-out process in which allocation of each individual item to a consequently selected receiver station is based on further operational conditions, and recommending change of one or more of the preset operational conditions based on the simulated efficiency.

13 Claims, 2 Drawing Sheets

METHOD FOR WEIGHT CONTROLLED BATCHING OUT OF ARTICLES HAVING NON-UNIFORM WEIGHT

The present invention relates to a method of batching out foodstuff items in a weight controlled manner from an incoming flow of such items, in which flow the items occur with non-uniform weights, by effecting allocation of items to a plurality of receiver stations, the method comprising determining the weight of the individual items and reading the weights into a control unit, determining a preferential allocation of each item to a consequently selected receiver station based on a) the total weight of items already located in the receiver station;
b) preset operational conditions such as batch target weight and item weight range, from which the item can be selected;
c) optionally, information as to expectable item weight distribution in said incoming flow of items; and effecting transfer of the item to the selected receiver station.

Typically, such an automatically controlled batching is carried out by means of a batching machine of the 'grader' type, comprising a weighing station for dynamically weighing the arriving items, and a following sorting-out conveyor passing along a row of receiver stations with associated, selectively operable diverter means for diverting the respective items into selected receiver stations, controlled by a control unit connected with the weighing station. The control unit or computer can be programmed with various operational conditions such as, of course, a desired target weight or minimum weight of the batches, an acceptable maximum overweight of each batch, and a specific item weight range for effectively selectable items.

The control unit may operate in a more or less sophisticated manner, spanning from a purely combinatory or simple accumulative merging of items based on the control unit allocating items up to a point, at which the control unit will, for each batch, call for a single item to conclude the batch within the preset weight limits, to higher developed methods of taking into account an expectable or actually detected weight distribution of the items in the supplied flow of items, whereby it is possible to control the batching process in such a manner that at the said "but one" stage the relevant receiver station will call for an item which is likely to be present in the supplied flow with a high degree of possibility, e.g. an item exhibiting an average weight of the supplied items when these exhibit a normal distribution. By way of example, GB 2 116 732 and WO 96/08322 illustrate such methods and apparatuses.

Now, in connection with natural foodstuff items such as whole fishes or cut parts of chicken, it may well happen that during the operation there is a shift of goods from one supplier to another, which is likely to change the item weight distribution in the flow of items. This, in turn, may affect the ease with which the batcher is able to merge items to the required target weight.

It is already known that in connection with the handling of a specific order or task it is possible, by way of analysis or estimation, to determine the efficiency of the batching based on information as to the weight distribution of the items, primarily with the purpose of effecting current addition of items to the item flow, e.g. items with atypical weight, in order to facilitate batching in case of a "difficult task". Typically, the target weight is desired to be a "whole" figure, e.g. 2 kg or 450 g, and all according to the weight distribution of the items it may be more or less easy to hit such figures. It has been found, however, that the said item addition technique is very difficult to administer.

With the present invention quite a different approach is made, viz. to effect estimation of a deviating target weight that will be better suited for a successful batching of the actual items, and then accept such an optimized target weight, leaving the "whole figure" practice. Of course, the price of the batches should be adjusted correspondingly, but to the final customers it may not be critical if a package, correctly labelled, holds e.g. 438 g or 461 g instead of 450 g. On the other hand, however, this will generally increase both the production capacity of the supplier and the degree of utilisation of the raw material, so giving the supplier the economics of production which allows a lower product price. At the same time, there are ecological benefits from increased usage—practically 100%—of the raw material.

The ultimate aim of this method is to make use of the entire distribution of the arriving items for one or more batching tasks, but a result of the said estimation or analysis may, under circumstances, be that the batching efficiency could in fact be optimized by sorting out some specific items, e.g. certain percentages of items from different weight ranges, such that the sorted out items can be planned to be used otherwise (without amounting to waste), while the remaining items will be perfectly usable for the batching work.

This will imply a certain manipulation with the preset operational conditions, and when a high capacity analyzer is used, e.g. the control computer itself or an auxiliary computer, it will then be possible to check any relevant conditions in order to determine an optimum for all of the conditions. At the outset, the analyzer can be supplied with the same conditions as those read into the control computer, and while both computers receive the same input as to the weights of the arriving items, the analyzer can carry out trial changes of the relevant conditions and by an evaluation function or an iterative process come up with different simulated results of such changes, which are then compared with the efficiency of the control unit's handling of the task. Some results will be poorer, but one or more may be better. If a better result is achieved (higher efficiency, less waste, less overweight, etc.), which shows a tendency to stabilize, a corresponding adjustment can be made, either manually or automatically, to the control unit, after which the simulator again begins to search for further possibilities of optimization.

The setting up of the operational conditions can be more or less detailed, and so the number of adjustable parameters will vary correspondingly. A basic parameter will be a minimum batch weight, and already at this point the simulator may recommend or effect an adjustment that will reduce the average overweight in connection with the conclusion of the respective batches by the allocation of the last item that will increase the batch weight to beyond the required minimum.

A further relevant parameter can be an upper limit for the overweight of each batch. This, in turn, may influence other parameters such as the number of receiving stations used for the particular batching job or task in cases where one or more other jobs are being handled simultaneously, thus also requiring a certain number of the available receiving stations. It will be readily understood that a requirement with respect to the addition of a last item for bringing the batch weight up to a limited overweight will call for relatively many receiver stations each waiting for an item to fulfill just this condition, in particular if the "limited overweight" is further defined as "the least possible overweight".

It is relevant at this point to mention that it may be beneficial to use a further control function, which can be designated "forced portion conclusion", referring to a situation in which a built-up partial batch lacking only a single item to reach the target weight does not, over a longer period of time, receive such an item. It reduces the efficiency of the apparatus if one or more receiver stations thus stand waiting passively for longer periods, in which case it is better and more economical to forcibly conclude such batches with an over-overweight item in order to then make the receiver station operative again.

Still further relevant control parameters will be the minimum and the maximum weight limits, within which the items for a given job or task are to be located, this being a typical wholesaler demand. However, if the supplier can demonstrate, based on the results of the simulator, that a better result is achievable by some deviation from these strict limits, then the customer may well renounce the strict requirements, still given that the associated changes will not affect the end user to any appreciable degree.

In the following the invention is further explained with reference to the drawing, in which FIG. 1 shows a normal weight distribution curve for chickens weighing between 1 and 2 kg.

Figure 1:
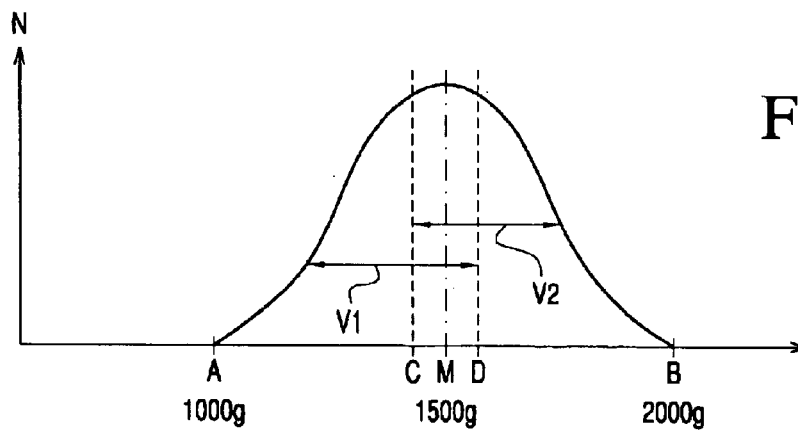

In connection with the handling of a flow of chickens with a weight distribution of the character shown in FIG. 1 it is a well known task to produce two different types of batches, viz. "lightweight batches" and "heavy batches" holding chickens from the lower weight range 1000–1500 g and the higher weight range 1500–2000 g, respectively. It is even practiced to effect a preparatory physical separation of the items belonging to the two ranges and then carry out the batchings as completely separated operations.

It is highly advantageous, however, to carry out the batchings as a "double job" on a grader machine, using the entire item flow and designating different receiver stations for the formation of the respective "light" and "heavy" batches. Again, if the customer can accept that in the light batches originating from the lower weight range V1 there may occur some items weighing somewhat more than the middle weight M, e.g. up to a higher limit D, then the batching efficiency may be greatly improved, because there will now be an increased number of "heavy" items to counter balance the lighter items in the range A–M. A similar consideration will show that for the batching of the heavy items from range V2 it is advantageous if the batches are allowed to contain items somewhat lighter than M, e.g. down to a lower limit C. According to the respective target weights the said simulator may be used to determine an optimum value for the limits C and D.

Figure 2:
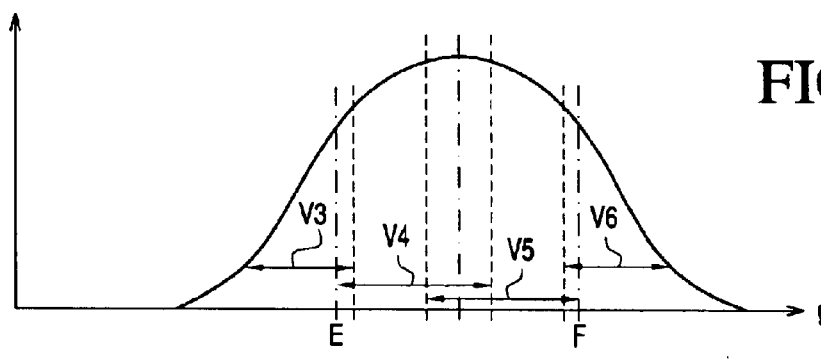
FIGS. 2–4 show similar curves with various modifications.

Corresponding considerations can be made in connection with tasks where an arriving flow of items is to be batched out in more than two weight classes, so that as shown in FIG. 2 there will arise division limits E and F which intersect the sloping parts of the distribution curve. Also here it applies that with the use of an overlapping area at each transition, an improved security will be achieved for a high degree of use of items for building-up target portions in the respective adjacent weight groups, and again the simulator is usable for optimising the location and width of the transition areas.

On the same basis, it will also be possible to optimise the merging of the items from the whole spectrum shown in FIG. 1 for the formation of portions which contain a certain number of items whose average weight (M) does not make up the target weight of the portions. It is obvious that with the given weight distribution, it will be most attractive to work with a target weight of a whole multiple of 1500 g, e.g. portions with the weight 9000 g for 6 pieces. However, if the target weight is set at 10,000 g (10 kg), the task is difficult to solve, but it immediately becomes easier if the task is redefined as a merging of part amounts of, e.g. 4000 and 6000 g respectively, formed by the merging of items with average weights of 1333 and 2000 g respectively. The control computer can "isolate" such complementary portions in a relatively easy manner, and particularly since it is able itself, via the simulator unit, to regulate and optimise the limits for the weight classes from which the relevant items are selected, including the degree of overlapping at the one and the other side of the respective limits. In this way, there can thus still be formed item portions with a total weight which is "one-sided" in relation to the total average weight.

Another and quite important variant is that it is possible to arrange the control so that portions are built up to a desired target weight and with a content of a certain number of items, most of which shall lie within a certain weight interval, while a smaller but also a certain number of items are allowed to originate from a broader weight interval. This arises as a widespread delivery requirement which has hitherto been complied with by a manual effort. However, it has now been found that also this task can be solved in a fully-automatic manner by use of the grader technique, by which it is certainly possible to distinguish between different weight intervals and at the same time exercise control over that number of items which can be allocated to one and the same portion from the different weight intervals. For example, what can be involved here is that from a flow of items in the weight interval 4–6 oz., portions shall be formed consisting of 24 items of a total weight of 120 oz., and with a content of 22 items in the weight interval 4½–5½ oz., and 2 items which are allowed to lie in an unknown weight area, e.g. in the whole of the 4–6 oz. weight interval. In principle it is relatively easy to provide a grader control which in a fully-automatic manner can effect this task by an associated combination of searches for suitable items for merging within the given weight areas. Work may well be carried out at the same time with additional tasks based on the same item flow, whereby it can also be relevant to work with above-mentioned floating transitions as supplement to the said sharp limits.

Figure 3:
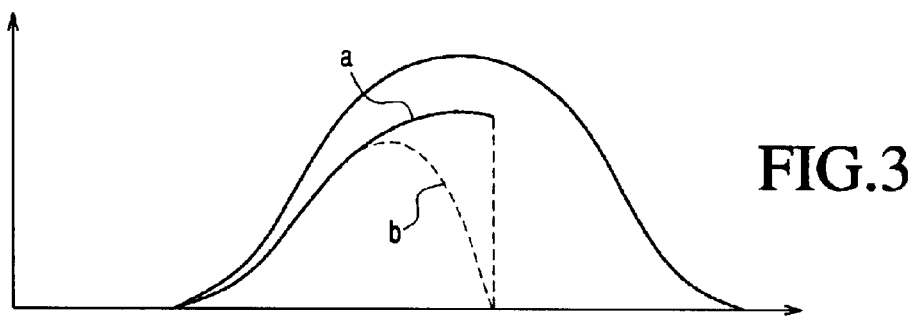

Moreover, it will be possible in advance to select a sorting-out of a certain percentage of, for example, the heaviest items, partly for the sorting-out of these for the formation of special portions, and partly hereby to bring the remaining item amount in better agreement with a distribution which is suitable for a consistent build-up of portions of fixed portion weight and item number. As far as the low weight area is concerned, this latter task can thus possibly be effected on the basis of the distribution curve a shown in FIG. 3.

According, to this aspect of the invention, it can be possible to define more or less any desired form of that or those distribution curves on the basis of which the portions for fixed weight/item number can be selected, for which use can be made of the simplest possible technique. With a suitable selectivity, it will even be possible to work with self-created normal distribution curves as shown by the stippled curve b in FIG. 3, in order to facilitate use of a simple batching algorithm.

Figure 4:
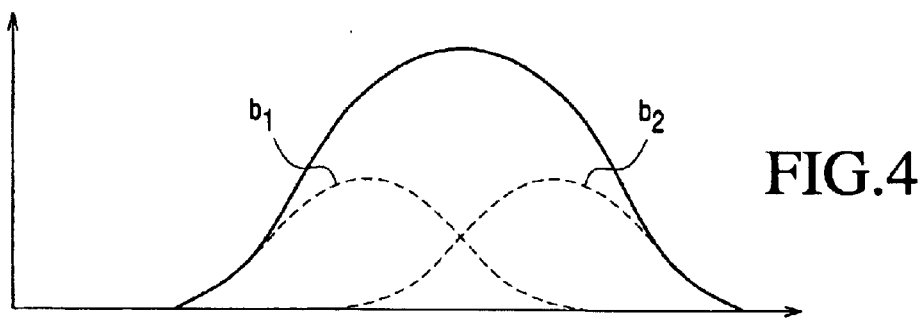

This theme is shown in extended form in FIG. 4, which shows an overlapping of the "self-created" distribution curves b1 and b2 for items in the light and the heavy area respectively of a two-part weight area. The same principle can apply just as well for weight areas divided into more than two sections.

The simulator may react rather quickly to changes which arise in the item weight and distribution, possibly even though this is not normal, and even relatively small changes will from time to time be able to give rise to considerable changes in the combination strategy, including choice of number of receiver stations for individual jobs, and an associated, very distinct improvement in the operational result.

Figure 5:
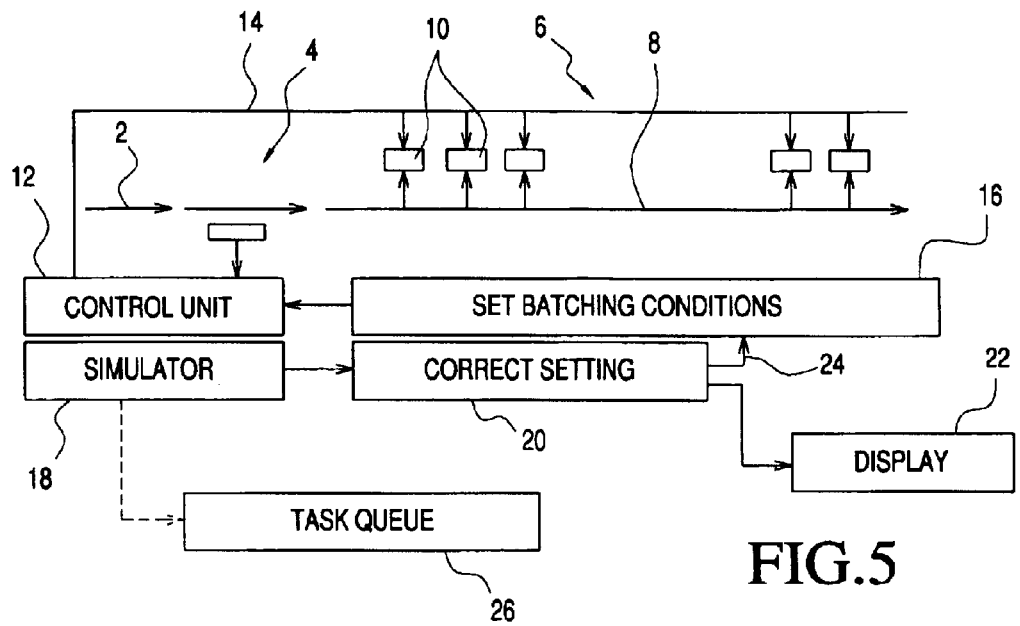
FIG. 5 is a schematic representation of a system according to the invention

FIG. 5 is a schematic representation of a system according to the invention. The system comprises an infeed conveyor 2, a weight determining station 4, and a following sorter section 6 shown as a conveyor 8 extending along a row of receiver stations 10. In a manner not shown, each of these stations comprises a selectively operable diverter member, by means of which items conveyed on the conveyor 8 can be let off to respective different receiver stations 10.

The weighing station 4 is connected to a control unit 12 which, through a control line 14, is connected to all of the receiver stations for controlling the operation of the said diverter members. The control unit 12 is connected with an input unit 16 for the reading in of relevant batching parameters as discussed hereinbefore.

Moreover, the control unit 12 comprises or is connected with a simulator unit 18, which receives the same input from the weighing station 4 as does the control unit 12, and which is, initially, provided with the same input conditions as read into the unit 16.

As described, the simulator unit 18 carries out trial changes of the various batching parameters and monitors any finding of a more successful combination of parameters by means of a printer and/or a display 22, which may of course also show details as to the improved batching efficiency, e.g. as a basis for a discussion with an actual customer as to the acceptability of a proposed parameter change. Under circumstances, an alternative can be to simply cause an automatic resetting of a relevant parameter as symbolised by a connection 24 from the unit 20 directly to the unit 16.

In this context it should be noted that the simulator 18 can have access not only to the batching parameters of the actually handled job, but also to jobs to be handled in the near future. Typically, the jobs to be handled by the supplier are specified with respect to batching criteria, amount and date of delivery, and the supplier may have knowledge about relevant shifts between raw material sources in the meantime. Thus, there will normally be a "batching task queue" 26 with all relevant parameters duly registered and searchable by the simulator. Many different criteria can be set up for such a searching, e.g.

finding tasks which are well suited to be handled in an efficient manner with the current or the expected item weight distribution;

finding tasks which may not be readily suitable for current handling, but could be so, provided they are handled simultaneously, wholly or partially.

finding tasks which are well suited to be handled in an efficient manner with the current or the expected item weight distribution;

finding tasks which may not be readily suitable for current handling, but could be so, provided they are handled simultaneously, wholly or partially;

For the handling of a difficult task it may be required to make use of a relatively high number of receiver stations, such that for each arriving item there will be good chances for an allocation to a station in which the item can be benefitially placed. The remaining few stations may then, normally, not be sufficient for the handling of the subsequent task if this is just 'a little difficult', but perhaps it could be found by simulated batching that task number four in the queue will be sufficiently easy to be handled by the current weight distribution. Ideally the simulation result could even be that the easy task requires many items having a weight that makes them difficult for allocation in connection with the difficult task, which will then, itself, become less difficult. This, in turn, may lead to a reduction of the high number of receiver stations for the difficult task and an associated increase of the low number for the easy task, which will then be still easier.

In practice it has been customary to arrange the control unit of the batching system directly as an integrated part of the system itself, with monitoring and read-in facilities placed next to the weighing station. In connection with the invention it is relevant to make use of two-way communication, also externally, and for this reason it has been found beneficial to arrange the data processing system in an office environment that should not necessarily be next to the production site.

The following example illustrates a simple application of the invention in connection with two batching tasks, where the invention can substitute for or be combined with a statistically based batching algorithm.

A grader with 10 batching stations.

The definition of the tasks to be processed on the grader is,

A task, task 1, of making 21 or 22 or 23 kg batches with items in weight range 1.00→1.60 kg.

A task, task 2, of making 22 or 23 or 24 kg batches with items in weight range 1.40→2.00 kg.

Minimum 4 and maximum 6 batching stations must be allocated to task 1.

Minimum 4 and maximum 6 batching stations must be allocated to task 2.

If the item weights are handled in 0.05 kg units, the total search space for the defined tasks is, Minimum batch weight for task 1=21 or 22 or 23 kg Minimum batch weight for task 2=22 or 23 or 24 kg Lower item weight limit for task 1=1.00 kg Upper item weight limit for task 1=1.40, 1.45, 1.50, 1.55 or 1.60 kg Lower item weight limit for task 2=1.40, 1.45. 1.50, 1.55 or 1.60 kg Upper item weight limit for task 2=2.0 kg Number of batching stations for task 1=4, 5 or 6

Number of batching stations for task 2=4, 5 or 6

Sum of batching stations for both stations=10

The optimisation criteria, typically a function of obtained batch excess weight and percentage of items used, must be defined. For simplicity, in this example, the overall task is to use as many items as possible, which reduces the optimisation criteria to be the least possible average excess batch weight. Alternatively an upper allowed batch weight is introduced, thus making it necessary to use an advanced batching algorithm, which rejects items that statistically do not fit in the batches.

To a given set of parameters in the search space a simulation is made to estimate the give away, and the parameters giving the best result are then applied on the grader.

Figure 6:
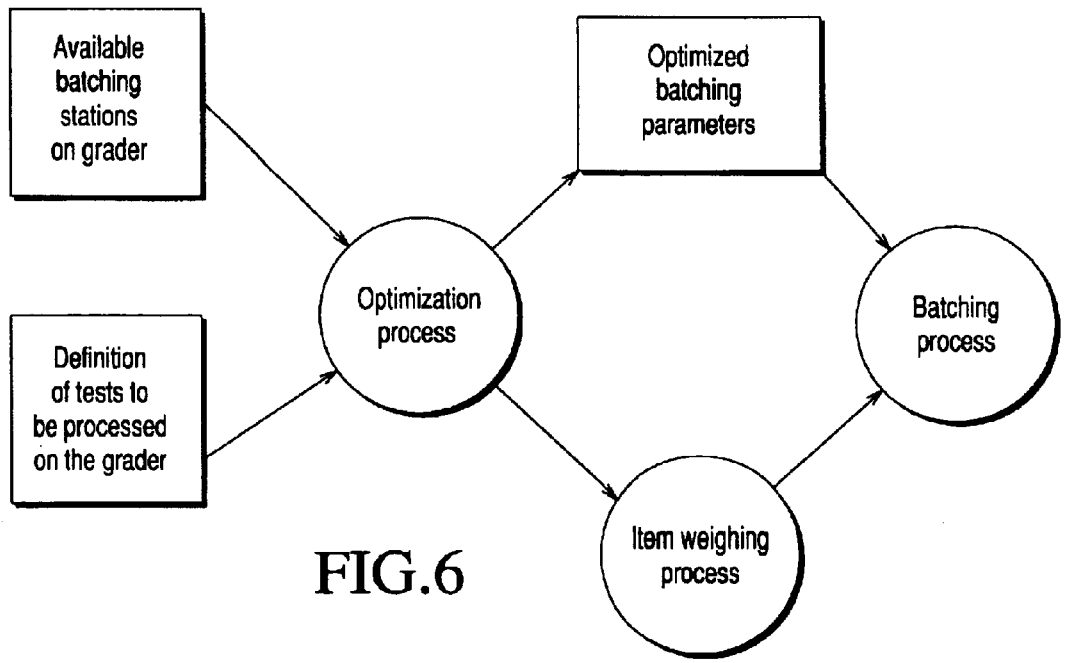
FIG. 6 is a data flow diagram thereof.

A data flow diagram of the described system is shown in FIG. 6.

The batching process handles the items according to the item data received from the item weighing process and the optimised batching parameters. The optimisation process finds the optimal batching parameters based on item data received from the item weighing process and the data defining the relevant search space.

The processing time necessary to find the optimal set of parameters can be reduced by different means. One possibility is to reduce the simulation to an estimation function, i.e. a function that checks if the average value of the item weights fits the batch weights. Another possibility is to optimise step by step, i.e. for a given set of parameters to find the optimum batch weight for task 1, then, with this new parameter, to find the optimum upper weight limit for task 1, etc.

The following steps shows an example of, how an optimising process could be implemented.

1. The set of "optimised batching parameters" are set to some initial values.
2. The optimisation process analyses the item weight flow and finds out that the number of items inside the item weight range for task 2 is larger than number of items inside the item weight range for task 1. This indicates that task 2 should have more batching stations than task 1.
3. The optimisation process simulates the batching process with "Set up A" and with an alternative set up B, where one batching station has been transferred from task 2 to task 1.
4. The optimisation process compares the 2 simulation results, and finds that "set up B" gives a smaller average batch overweight than that of "Set up A", and moves one of the batching stations in the set of "Optimised batching parameters" from task 2 to task 1.
5. The batching process finishes a batch on the batching station that has been transferred from task 2 to task 1, the batching process then starts to batch according to task 1 parameters at this batching station.
6. The optimising process simulates the batching process with "Set up B" and with a number of alternative set ups, where the upper item weight limit for task 1, and the lower item weight limit for task 2 are changed. The set up which gives the best results is transferred to the set of "Optimised batching parameters", where the set up is read and used by the batching process.
7. The optimising process simulates the batching process with "Set up C" and with a number of alternative set ups, where the minimum batch weight for task 1, and the minimum batch weight for task 2 are changed. The set up which gives the best results is transferred to the set of "Optimised batching parameters", where the set up is read and used by the batching process. Because the sizes of the batches are changed, the batching process might be programmed to finish a "package" of batches for each task, before the new parameters are used.
8. The optimising process restarts the optimisation cycle.

As an alternative to the described implementation, the optimisation process could simulate or estimate the batching results for all possible parameter combinations before transferring the best choice to the batching process. This, however, may require a lot of computation power and in most cases it will be sufficient to operate with a few key parameters.

What is claimed is:

1. A method of batching out foodstuff items in a weight controlled manner from an incoming flow of said items, said items having non-uniform weights, by allocating said items to a plurality of receiver stations, said method comprising the steps of:

determining weight of individual items;

determining preferential allocation of each individual item to a consequently selected receiver station based on accumulated weight of items already located in the selected receiver station, and initially preset operational conditions including at least one of a batch target weight and an item weight range;

portioning-out said items by transferring each individual item to the allocated selected receiver station;

calculating efficiency of ongoing portioning-out process using at least one operational parameter selected from the parameters of: batch target weight or weight range, acceptable batch overweight, acceptable batch underweight, absolute maximum item weight, absolute minimum item weight, maximum number of items in package, minimum number of items in package, an allowable weight range from which said individual items are selected, an allowable weight range from which a limited number of individual items for each batch are selected, number of receiver stations to which an item may be allocated for creating batches;

calculating simulated efficiency of a portioning-out process in which allocation of each individual item to a consequently selected receiver station is based on at least one of said operational parameters without regard to said initially preset operational conditions; and recommending changing of one or more of said preset operational conditions based on said simulated efficiency.

2. A method according to claim 1, wherein the step of recommending changes to one or more of said preset operational conditions is performed automatically.

3. A method according to claim 1, wherein said step of determining preferential allocation of each individual item to a consequently selected receiver station is at least partially based on information regarding expected item weight distribution in said incoming flow of items.

4. A method according to claim 1, wherein the relevant parameters used to calculate the efficiency of the ongoing portioning-out include overweight beyond the batch target weight, and percentage of non-allocatable items.

5. A method according to claim 4, wherein said non-allocatable items are at least one of recirculation and waste.

6. A method according to claim 1, further including the step of associating the determined item weights with externally provided property information for over-riding selected parameters.

7. A method according to claim 1, further including the step of reading the determined weights into a control unit, wherein said control unit maintains information regarding operational status of items already located in said receiver stations, said information being regarding at least one of accumulated weight and item count, item weight categories, and item types.

8. A method according to claim 1, wherein said preset operational conditions pertain to at least a portion of items in batches of items.

9. A method according to claim 1, wherein distribution of items that are allocated to at least one type of batch of items is based on multiple acceptable item weight ranges, said allocation of each item from each of said item weight ranges being restricted by said other further operational conditions, said further operational conditions being at least one of the following parameters:

- at least one of minimum and maximum part count or weight of an individual total batch;
- at least one of minimum and maximum part count or weight of items used in said at least one type of batch, thus defining at least a portion of said distribution of items used in said at least one type of batch; and
- at least one of minimum and maximum part count or weight of all weighed items, said weighed items being distributed to specific types of batches based on said multiple acceptable item weight ranges.

10. A method according to claim 1, wherein alternative operational conditions are restricted by a queue having tasks, each task comprising an amount of batches to be produced and a set of parameters defining properties of the batches to be produced by the task.

11. A method according to claim 1, further including the step of simultaneously building item batches belonging to multiple tasks, each task having individual operational conditions.

12. A method according to claim 1, wherein a specific target weight for a batching task is changed within certain limits in accordance with said recommended changes, whereas final price of said batches is set so as to reflect nominal price per weight unit of the batched items.

13. A method according to claim 1, wherein the step of calculating efficiency of ongoing portioning-out process is based on parameters of already registered tasks to be handled subsequently at a future time, such that said recommended change is at least partially based on subsequent tasks to be handled.

* * * * *